(12) United States Patent
Ramraika et al.

(10) Patent No.: US 9,840,150 B2
(45) Date of Patent: Dec. 12, 2017

(54) THREE PHASE REGULATOR RECTIFIER FOR AUTOMOTIVE BATTERY CHARGING AND CONTROL APPLICATION SUITABLE FOR OF A TWO WHEELED VEHICLE

(71) Applicant: Star Engineers (I) Pvt Ltd, Pune (IN)

(72) Inventors: Divya Ramraika, Pune (IN); Saurabh Madhu, Pune (IN); Anil Kamlellu, Pune (IN)

(73) Assignee: STAR ENGINEERS (I) PVT. LTD, Pune (IN)

( * ) Notice: Subject to any disclaimer, the term of this patent is extended or adjusted under 35 U.S.C. 154(b) by 201 days.

(21) Appl. No.: 14/945,731

(22) Filed: Nov. 19, 2015

(65) Prior Publication Data

US 2016/0144732 A1    May 26, 2016

(51) Int. Cl.
| | |
|---|---|
| *H02J 7/00* | (2006.01) |
| *B60L 11/18* | (2006.01) |
| *H02J 7/02* | (2016.01) |
| *H02M 7/162* | (2006.01) |
| *H02M 7/219* | (2006.01) |
| *H02J 7/14* | (2006.01) |
| *H02M 1/08* | (2006.01) |

(52) U.S. Cl.
CPC .......... *B60L 11/1811* (2013.01); *H02J 7/022* (2013.01); *H02J 7/14* (2013.01); *H02M 7/1626* (2013.01); *H02M 7/219* (2013.01); *H02M 1/083* (2013.01); *H02M 2007/2195* (2013.01); *Y02T 90/127* (2013.01)

(58) Field of Classification Search
USPC .................. 320/108, 107, 109, 110, 162
See application file for complete search history.

(56) References Cited

U.S. PATENT DOCUMENTS

| | | | |
|---|---|---|---|
| 4,659,977 A | 4/1987 | Kissel et al. | |
| 5,726,558 A * | 3/1998 | Umeda .................. | H02J 7/166 322/25 |
| 2007/0241699 A1* | 10/2007 | Osada ..................... | H02P 5/74 318/141 |
| 2008/0030184 A1* | 2/2008 | Okahara ................ | H02P 9/305 323/286 |
| 2009/0058337 A1* | 3/2009 | Kato ....................... | B60L 11/14 318/400.09 |
| 2009/0251831 A1* | 10/2009 | Shiba ..................... | B60L 3/003 361/30 |
| 2012/0001598 A1* | 1/2012 | Horihata ............ | H02P 29/0241 322/21 |
| 2012/0043818 A1* | 2/2012 | Stratakos ............... | H02J 3/383 307/77 |

* cited by examiner

*Primary Examiner* — Brian Ngo
(74) *Attorney, Agent, or Firm* — The Roy Gross Law Firm, LLC; Roy Gross

(57) ABSTRACT

A three phase regulator rectifier for automotive battery charging applications of a two wheeled vehicle having a few discrete components and providing programmable feedback control for improved efficiency in battery charging applications.

5 Claims, 15 Drawing Sheets

1000 RPM

BATTERY CHARGING

ALTERNATOR

BATTERY CHARGING

ALTERNATOR

2000 RPM

3000 RPM

BATTERY CHARGING

ALTERNATOR

4000 RPM

BATTERY CHARGING

ALTERNATOR

5000 RPM

BATTERY CHARGING

ALTERNATOR

6000 RPM

BATTERY CHARGING

ALTERNATOR

7000 RPM

BATTERY CHARGING

ALTERNATOR

8000 RPM

BATTERY CHARGING

ALTERNATOR

9000 RPM

10000 RPM

THREE PHASE REGULATOR RECTIFIER FOR AUTOMOTIVE BATTERY CHARGING AND CONTROL APPLICATION SUITABLE FOR OF A TWO WHEELED VEHICLE

FIELD OF THE INVENTION

The invention relates to battery charging system used in two wheeled vehicles. In particular, this invention relates to a three phase regulator rectifier adapted to regulate voltage when connected in a series configuration or alternatively in a shunt configuration of a two wheeled vehicle.

BACKGROUND OF THE INVENTION

A voltage regulator is an essential part of a vehicle charging system, for keeping a lead acid battery in a charged condition and also to supply the energy requirements of the vehicle when the engine is running. Typically when the engine is at stand still the lead acid battery connected to the electrical circuit of a two wheeler supplies the electrical demands. Older versions of two wheelers where invariably of "kick start" type, requiring a manual and forced rotation of the crank shaft to induce engine start. This rotation also energized a direct current generator or magneto (A small dynamo with a secondary winding that produces a high voltage) enabling a spark to jump between the poles of a spark plug in a gasoline engine. The modern two wheelers invariably have a "self start" system having a starter motor for starting the vehicle. Also modern two wheelers use an alternator having permanent magnet rotors, to produce alternating current, as it is more rugged and maintenance free as compared to a generator producing direct current.

The voltage regulator includes a feed back and control circuitry for varying output voltage of the alternator in accordance to the load changes of the vehicle's electrical components such as lights, signal system, horns and engine control systems. The load conditions vary considerably in twilight mode and night mode. The voltage regulator also includes a power rectification circuit connected to the feedback and control circuitry. The feedback and control circuitry changes the duty cycle of the generator or alternator by increasing or decreasing the power output of the rectification circuit in a predetermined manner based on monitored load changes. The feedback and control circuitry comprises of integrated semiconductor device which has circuits adapted to sense continuously variable physical quantity and magnitudes in discrete units of a physical quantity. These circuits can be configured by programming the integrated semiconductor device.

A battery charging systems consist broadly of the following components:
1) Three phase regulator systems
2) AC voltage regulators/DC voltage regulators
3) Shunt (short) type/Open (series) type regulators
4) SCR based/MOSFET based/IGBT based power rectification systems.

A suitable combination of the above components is selected, to meet the needs of battery charging and energizing system. Depending on the electrical design of the vehicle two or more of the above components are used in an automotive battery charging system for motorcycles. The output of the power rectification circuit is controlled in accordance to the load changes of the vehicle's electrical components by the feedback and control circuitry for meeting the instantaneous electrical loads in either alternating or direct current modes and also apply a constant voltage difference across the terminals of the lead acid battery in direct current mode.

Typically two wheeler regulator rectifiers are designed to rectify the alternating current output of the alternator into a DC voltage of 14.5 volts and feed the regulated voltage to the battery whenever the voltage across the battery terminals fall below the designated voltage.

U.S. Pat. No. 4,659,977 discloses a microprocessor-based electronic voltage regulation system for controlling the charging of the battery in a vehicle. The conventional voltage regulator is eliminated and the microprocessor of the engine control unit (ECU) is used to regulate the output of the alternator. The battery temperature signal from a temperature transducer and a battery voltage signal from a sense line connected directly to the positive terminal of the battery are supplied to the microprocessor through an analog-to-digital converter. The temperature signals are used to select a desired set point voltage for charging the battery based on relationship between battery temperature and desired battery voltage with preset maximum and minimum voltage set point levels. Excitation current supplied to the rotor windings is controlled in accordance with a comparison between the desired set point voltage and the battery voltage signal by a control signal generated by the microprocessor using a power switching circuit. Other input to the ECU includes vehicle deceleration, throttle position, and engine RPM and elapsed time since ignition. These inputs are further processed to modify the desired voltage set point or modify engine RPM in accordance with driving conditions. Over-current protection for the logic circuitry and improved diagnostic capabilities are also provided.

This type of system for battery charging using a microprocessor is not a stand-alone system and is dedicated for specific application and will have to custom designed and built for different vehicles. Also it will necessarily involve many discrete circuits and components, making the unit very expensive. Any failure of a component of the system will affect the overall performance. In such a system fault tracing will be time consuming and will have to carried out by trained and skilled personnel.

Thus, there is a need for a device that is adapted to carry out battery charging operation in an automotive two wheeler application which overcomes the problems hitherto encountered in the prior art devices.

SUMMARY OF THE INVENTION

One of the objects of the present invention is to overcome the disadvantages of the prior art battery charging systems by using the integrated hardware programmable semiconductor device.

Another object of the present invention is to reduce the number of discrete circuitry used in the prior art battery charging system by use of programmable Analog and Digital circuit paths but in to a standard hardware chip.

Yet another object of the present invention is to improve the performance of battery charging system by the use a standard hardware chip to achieve higher precision in terms of component tolerances.

Yet another object of the present invention is to reduced the size of the printed circuit board (PCB) by integrating all standard circuits within the standard hardware chip.

Yet another object of the present invention is to reduce the time of manufacturing of different capacity three phase regulator rectifier by the use of standard hardware chip and reduced number of discrete custom built components.

Yet another object of the present invention is to have increased reliability of the three phase regulator rectifier battery charging system by reducing the component count of the system.

Yet another object of the present invention is to have a common voltage regulator module for different specifications of the battery charging system.

Still another object of the present invention is to reduce the development time of a custom built battery charging system and cost by the use of programmable standard hardware components.

Another object of this invention is to provide a regulator rectifier, for battery charging function using an alternator, which is adapted to receive and process mixed signals consisting of analog and digital circuitry.

Another object of this invention is to provide a regulator rectifier, for battery charging function using an alternator, that is a standalone unit and functionally independent of the vehicles engine control unit.

Another object of this invention is to provide a regulator rectifier, for battery charging function using an alternator, that is adapted to function even in adverse atmospheric conditions and in inclement weather.

Yet another object of this invention is to provide a regulator rectifier, for battery charging function using an alternator, that is free from wear and tear of the components and adapted to function accurately repeatedly.

Yet another object of this invention is to provide a regulator rectifier, for battery charging function using an alternator, that can function even at high ambient temperatures.

Yet another object of this invention is to provide a regulator rectifier, for battery charging function using an alternator, that is easy to install.

Yet another object of this invention is to provide a regulator rectifier, for battery charging function using an alternator, which does not require periodic servicing or maintenance to be carried out.

According to this invention there is provided a three phase regulator rectifier, for two wheeler battery charging application, adapted to rectify an alternating current output of a rotary power generating member first to energize connected electrical components of the two wheeler and second to apply a defined potential difference between terminals of a lead acid battery to maintain a charged state of said battery, said device comprising:

(i) a plurality of stationary coils annularly positioned around magnetic flux of a rotary member; said coils interconnected in sets of three so as to induce electromagnetic force alternating from positive to negative in each of the three sets in a phased manner;

(ii) semiconductor circuits adapted to modify said induced electromagnetic force from an alternating form to a steady state in each of said three set of coils;

(iii) an integrated programmable semiconductor chip provided with circuits adapted to sense continuously variable physical quantity and magnitudes in discrete units of a physical quantity; said semiconductor chip adapted to alter the said alternating and steady state electromagnetic force to energize connected electrical components of the two wheeler and to apply a defined potential difference between terminals of a lead acid battery respectively; and (iv) A feedback and control circuit integral to said programmable semiconductor chip adapted to sense varying energy load of said electrical components so as to intermittently maintain a preset steady state potential difference between said battery terminals.

Typically the integrated programmable semiconductor chip provided with configurable circuits including low pass or band pass filters, digital buffers, programmable gain amplifiers, programmable PWM signal generators, programmable Temperature sensors, ramp or signal generators, zero crossing detectors and charge pump circuits.

Typically the semiconductor circuits comprises of SCR, MOSFET, IGBT and such other circuits in combination of at least two connected either in series or in parallel between stationary coils of the rotary power generating member and lead acid battery.

Typically the semiconductor circuits are connected between the stationary coils of rotary power generating member and the battery of the vehicle system with or without fuse links in between.

Typically the integrated programmable semiconductor chip in cooperation with said feedback and control circuit and semiconductor circuits are adapted to control three phase rectification bridge connected to the a rotary power generating member.

BRIEF DESCRIPTION OF THE DRAWINGS

All aspects and advantages of the present invention will become apparent with the description of the preferred non limiting embodiment, when read together with the accompanying drawings, in which.

DETAILED DESCRIPTION OF THE INVENTION

The Indian patent application having reference number 3563/MUM/2014, having priority date 20 Nov. 2014, filed by the same assignee, is hereby incorporated by reference.

Conventional battery charging systems consist of voltage regulator with either a discrete transistor or a custom integrated circuit known as an Application Specific Integrated Circuit (ASIC). These types of voltage regulator circuits often are hard-wired circuits provided with custom designed specific functions suitable only for a specific type of vehicle.

Figure 1:
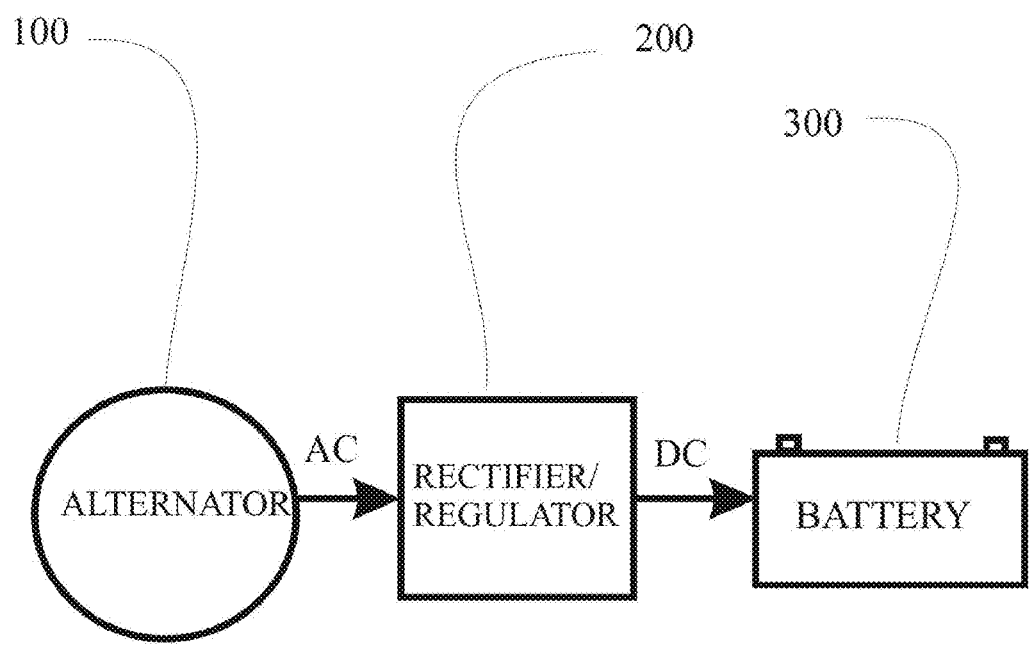
FIG. 1 is the basic working diagram of conventional battery charging function of a automotive vehicle using an alternator.

Some of the other versions of automotive battery charging systems have deleted the voltage regulator altogether and use microprocessor controllers as part of the ignition module or vehicle control module that controls all functions of the motorcycle. Other vehicle designs have used voltage regulators with advanced microprocessor functions that maintain a regulated voltage produced by an alternator, but include advanced clock and memory circuits that store battery and power supply reference data, battery voltage and generator rotation speed, and determine how much the battery is being charged and at what rate at any point in time. The present invention relates to a three phase regulator rectifier for automotive battery charging applications of a two wheeled vehicle having lesser discrete components and feedback control for improved efficiency Referring to FIG. 1, the basic functional details of the system components are depicted. The alternator (100) produces alternating current and the rectifier regulator (200) converts the alternating current to direct current and a constant voltage is applied to the lead acid battery (300) to keep it in charged condition.

Figure 2:
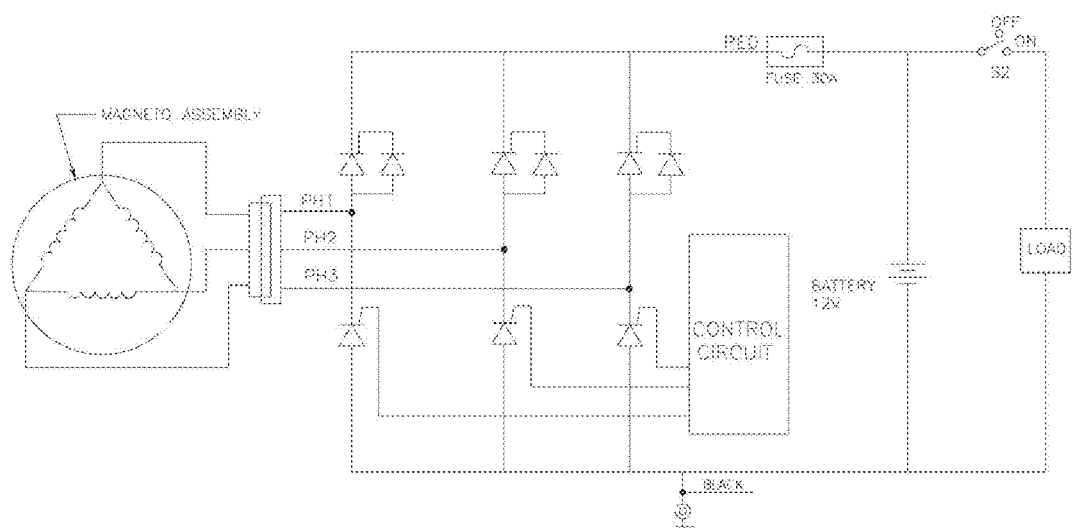
FIG. 2 is the block diagram of a three phase automotive alternator and power rectification SCR (Silicon-controlled) rectifier circuit connected in series showing aspects and the inter connection in accordance with this invention.

Referring to FIG. 2, is the block diagram of a three phase automotive alternator and power rectification SCR (Silicon-controlled) rectifier circuit connected in series showing aspects and the inter connection. The series voltage regulator operates by using a variable element in series with the load. In this way a series voltage regulator provides an effective form of voltage regulation. The series voltage regulator uses a variable element placed in series with the load. The advantage of the series voltage regulator is that the amount of current drawn is effectively that used by the load, although some will be consumed by the circuitry associated with the regulator. Unlike the shunt regulator, the series regulator does not draw the full current even when the load does not require any current. As a result the series regulator is considerably more efficient.

Figure 3:
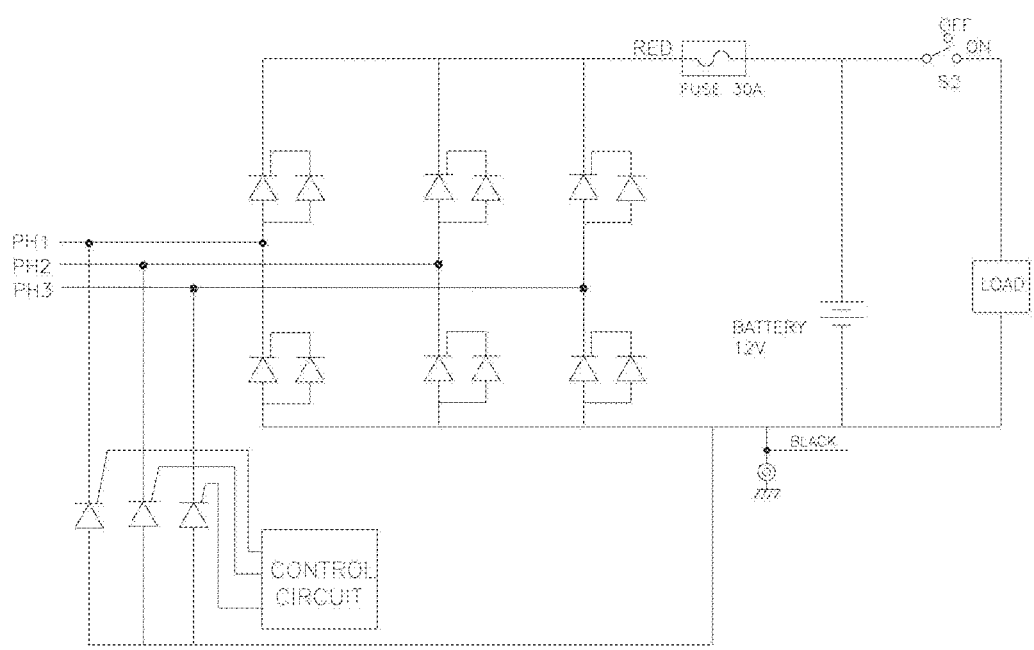
FIG. 3 is the block diagram of a three phase automotive alternator and power rectification SCR (Silicon-controlled) rectifier circuit connected in parallel (shunt) showing aspects and the inter connection in accordance with this invention.

Referring to FIG. 3, is the block diagram of a three phase automotive alternator and power rectification SCR (Silicon-controlled) rectifier circuit connected in parallel (shunt) showing aspects and the inter connection. A shunt regulator detects output voltage variation via external resistors by using an error amplifier and controls a transistor connected in parallel to the load to keep the output voltage constant.

Figure 4:
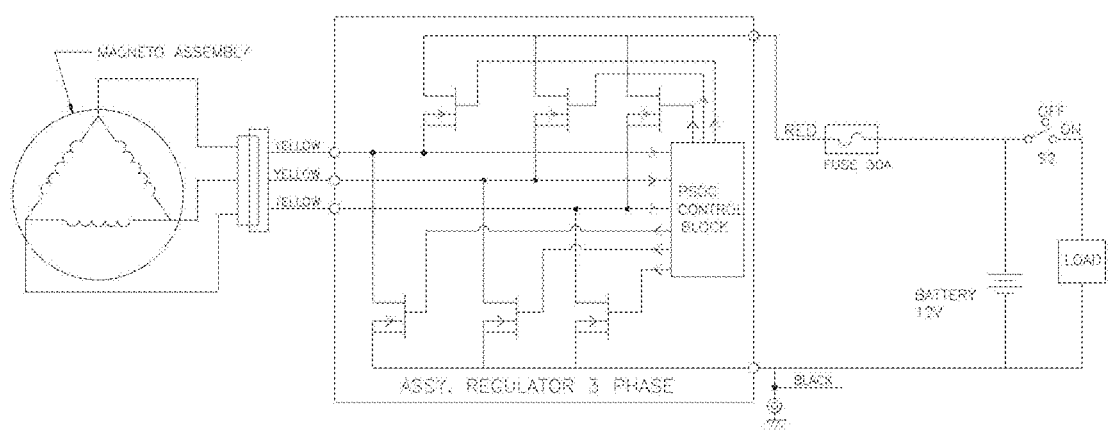
FIG. 4 is the block diagram of a three phase automotive alternator and power rectification MOSFET (Metal-oxide-semiconductor field-effect transistor) rectifier circuit connected in series showing aspects and the inter connection in accordance with this invention.

Referring to FIG. 4, the block diagram of a three phase automotive alternator and power rectification MOSFET (Metal-oxide-semiconductor field-effect transistor) rectifier circuit connected in series and the inter connection between control circuit and load is shown. A variable element in series with the load is used to provide an effective form of voltage regulation.

Figure 5:
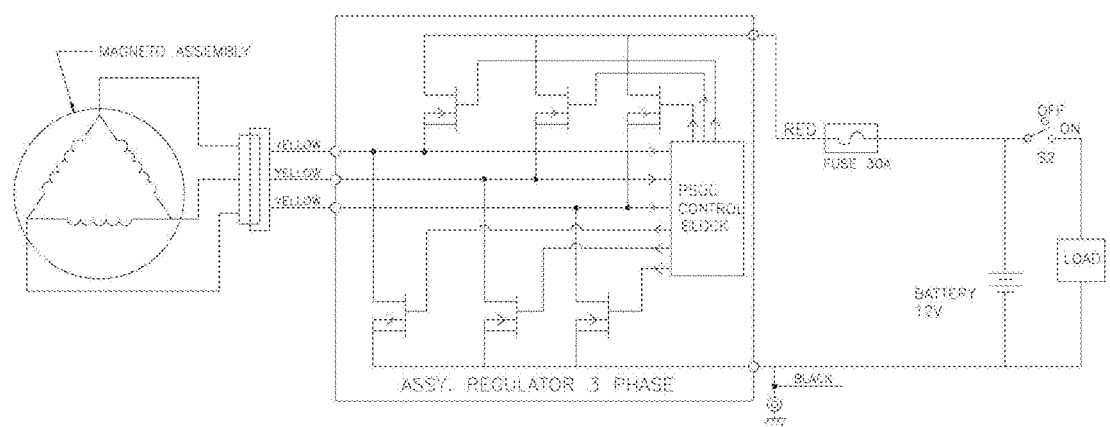
FIG. 5 is the is the block diagram of a three phase automotive alternator and power rectification MOSFET (Metal-oxide-semiconductor field-effect transistor) rectifier circuit connected in parallel (shunt) showing aspects and the inter connection in accordance with this invention.

Referring to FIG. 5, the block diagram of a three phase automotive alternator and power rectification MOSFET (Metal-oxide-semiconductor field-effect transistor) rectifier circuit connected in parallel (shunt) and the inter connecting circuit is shown. A shunt regulator detects output voltage variation via external resistors by using an error amplifier and controls a transistor connected in parallel to the load to keep the output voltage constant.

Figure 6:
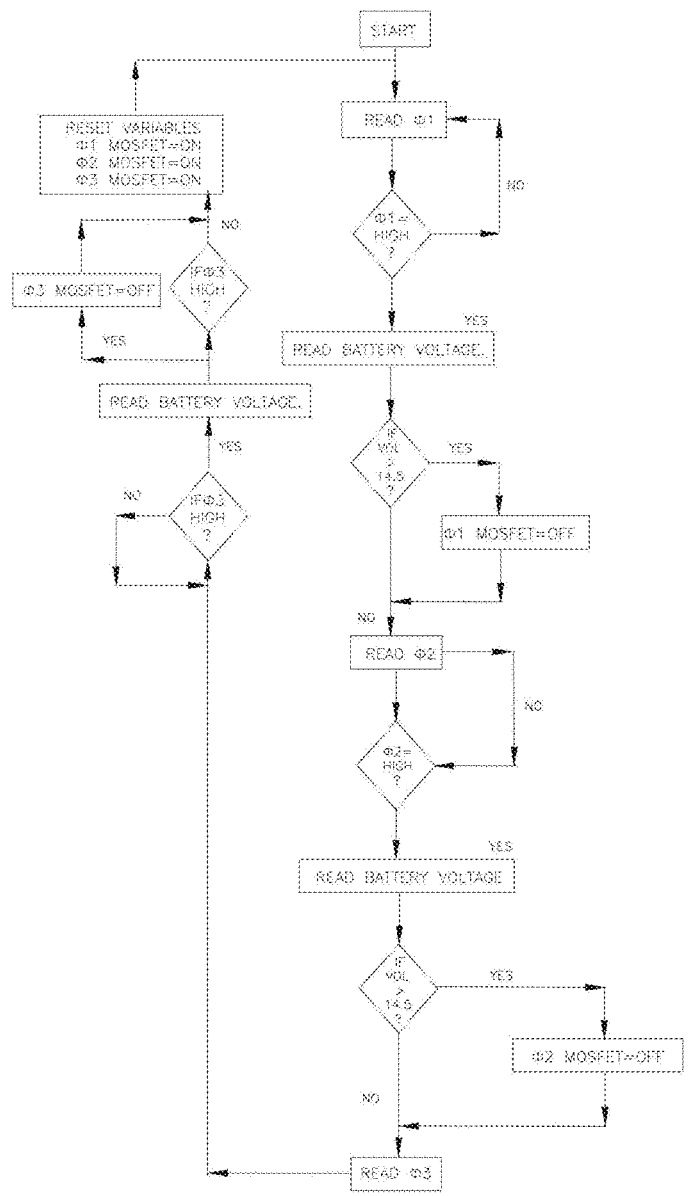
FIG. 6 is the working logic flow chart of the three phase automotive alternator based battery charging system, having a MOSFT bridge rectification, in accordance with this invention.

Referring to FIG. 6 is the working logic flow chart of an embodiment of the invention using a MOSFET (Metal-oxide-semiconductor field-effect transistor) rectifier circuit for three phase rectification.

Figure 7:
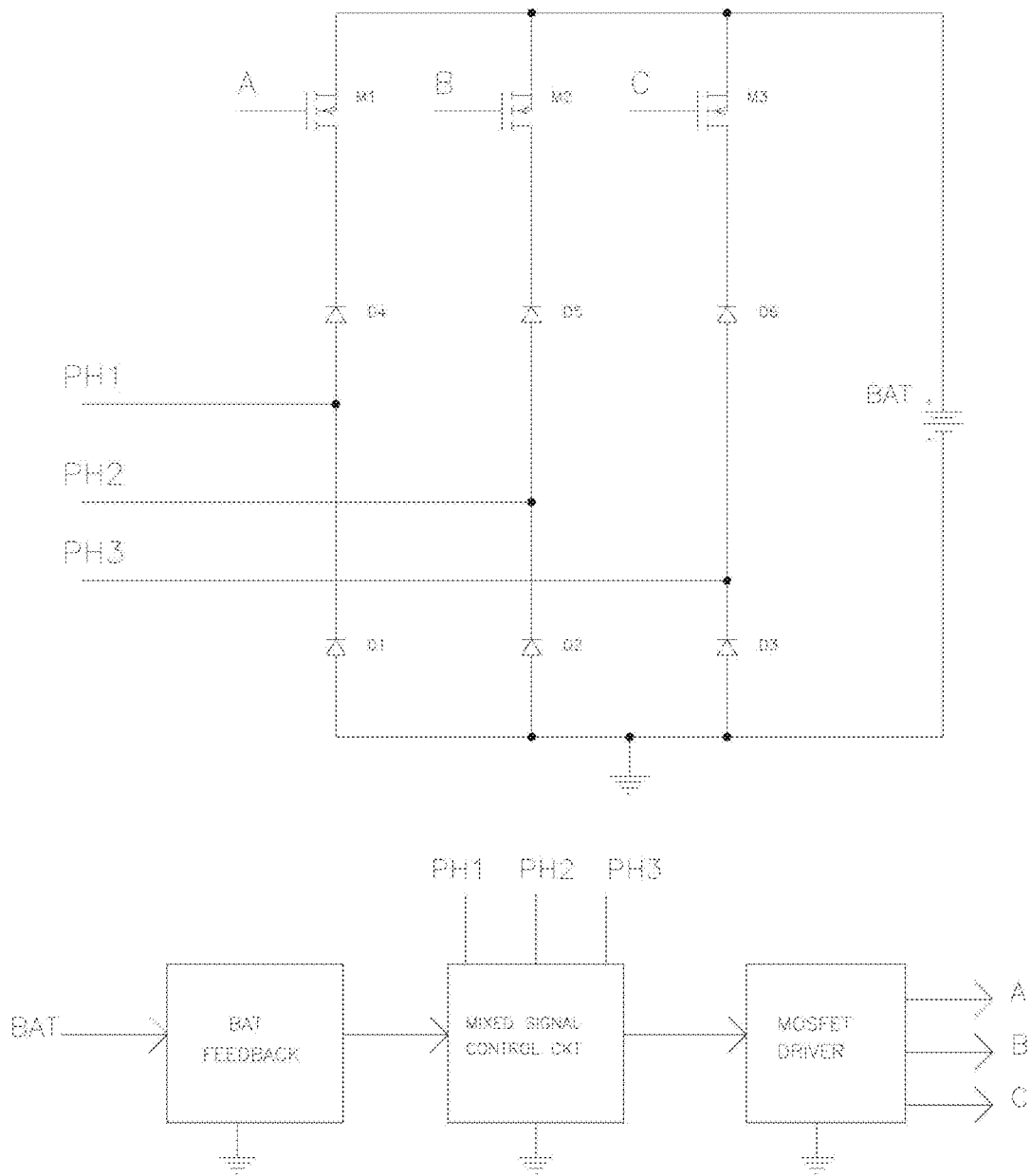
FIG. 7 is the basic configuration diagram of the, three phase automotive alternator based battery charging, power rectification MOSFET (Metal-oxide-semiconductor field-effect transistor) rectifier circuit connected in series in accordance with this invention.

Referring to FIG. 7 depicts the basic configuration of the, three phase automotive alternator based battery charging, power rectification MOSFET (Metal-oxide-semiconductor field-effect transistor) rectifier circuit connected in series.

Figure 8:
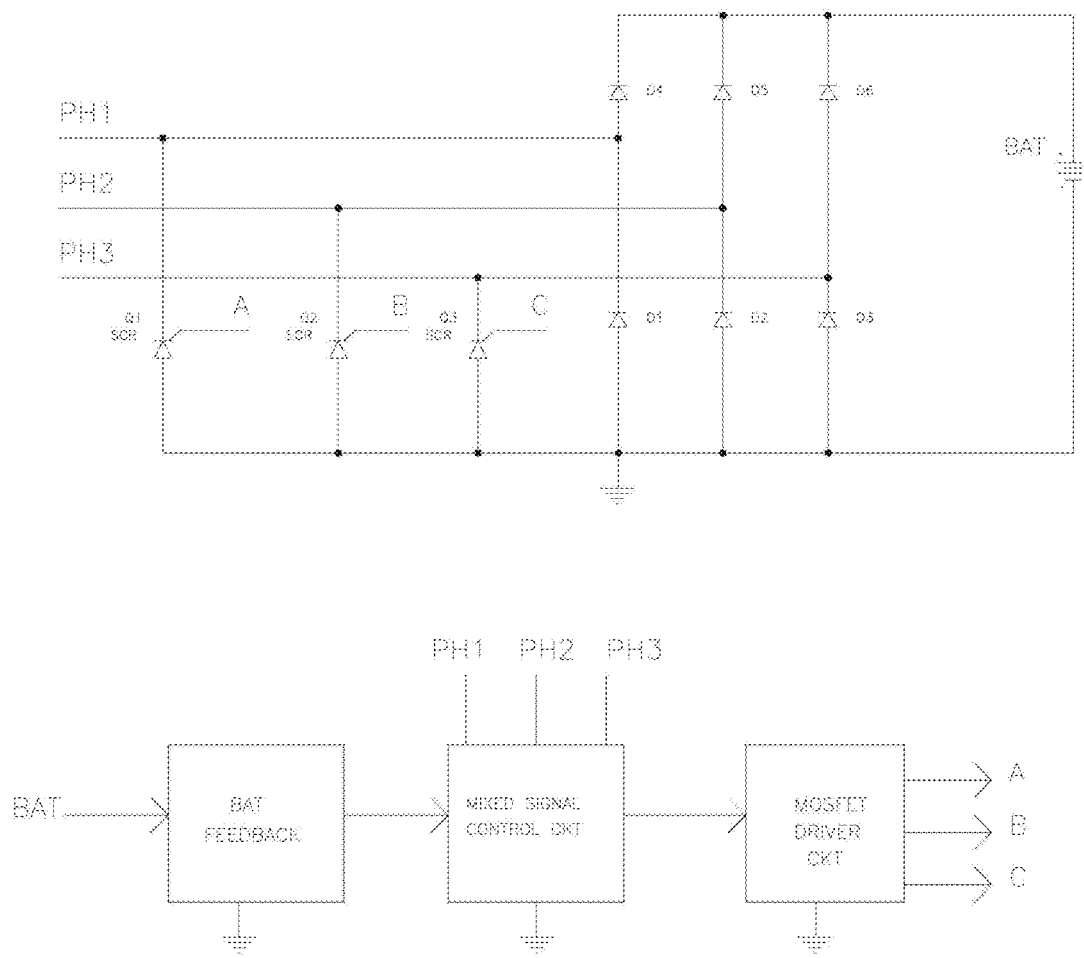
FIG. 8 is the basic configuration diagram of the, three phase automotive alternator based battery charging, power rectification SCR (Silicon-controlled) rectifier circuit connected in series rectifier circuit connected in series in accordance with this invention.

FIG. 8 depicts the basic configuration of the, three phase automotive alternator based battery charging, power rectification SCR (Silicon-controlled) rectifier circuit connected in series rectifier circuit connected in series.

Figure 9:
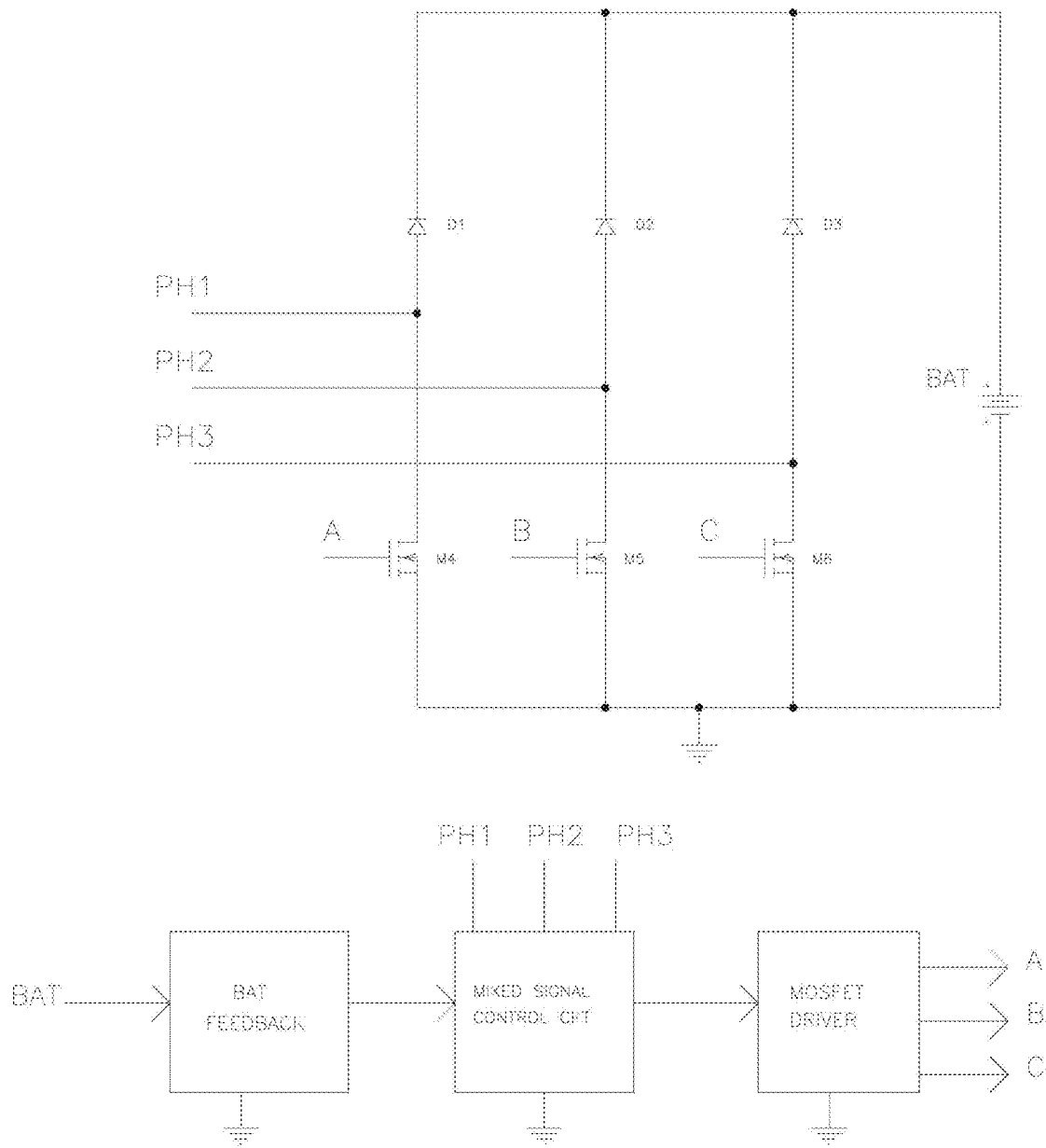
FIG. 9 is the basic configuration diagram of the, three phase automotive alternator based battery charging, power rectification MOSFET (Metal-oxide-semiconductor field-effect transistor) rectifier circuit connected in parallel (shunt) in accordance with this invention.

FIG. 9 depicts the basic configuration of the, three phase automotive alternator based battery charging power rectification MOSFET (Metal-oxide-semiconductor field-effect transistor) rectifier circuit connected in parallel (shunt).

Figure 10:
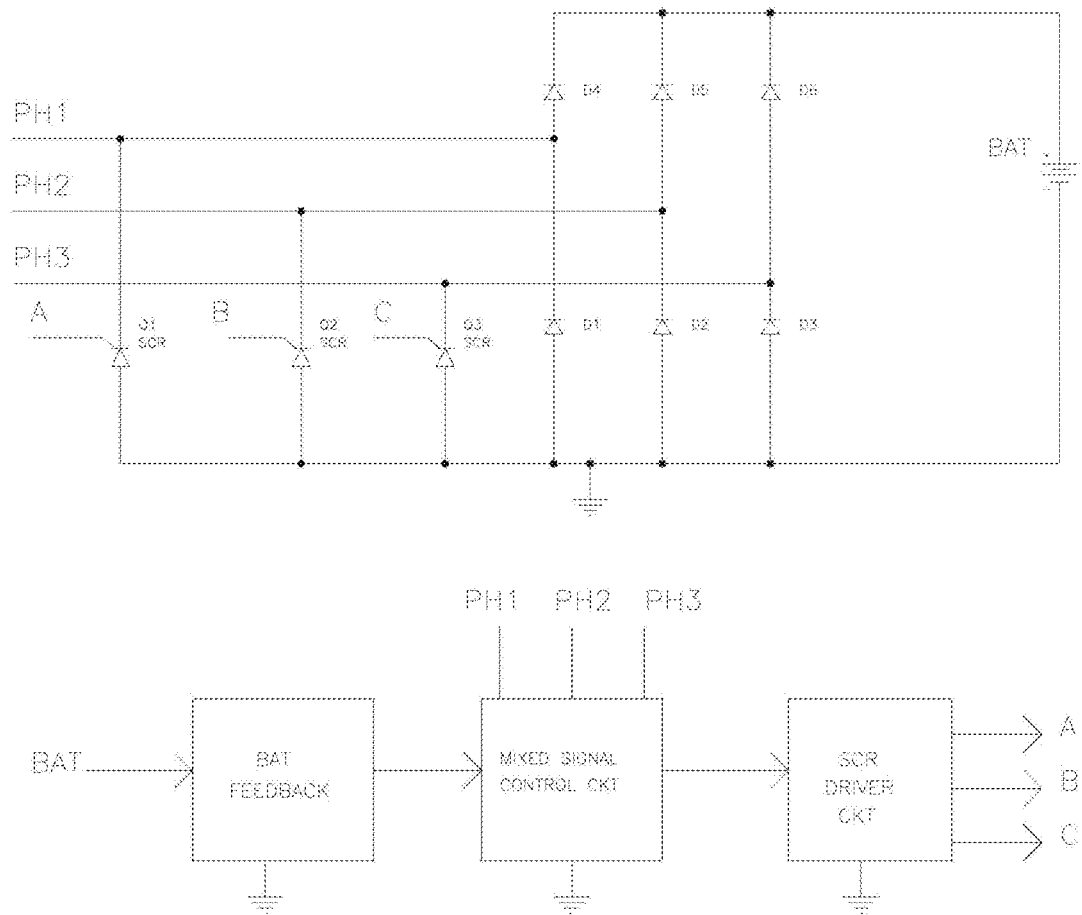
FIG. 10 is the basic configuration diagram of the, three phase automotive alternator based battery charging, power rectification SCR (Silicon-controlled) rectifier circuit connected in series rectifier circuit connected in parallel (shunt) in accordance with this invention.
Figure 11:
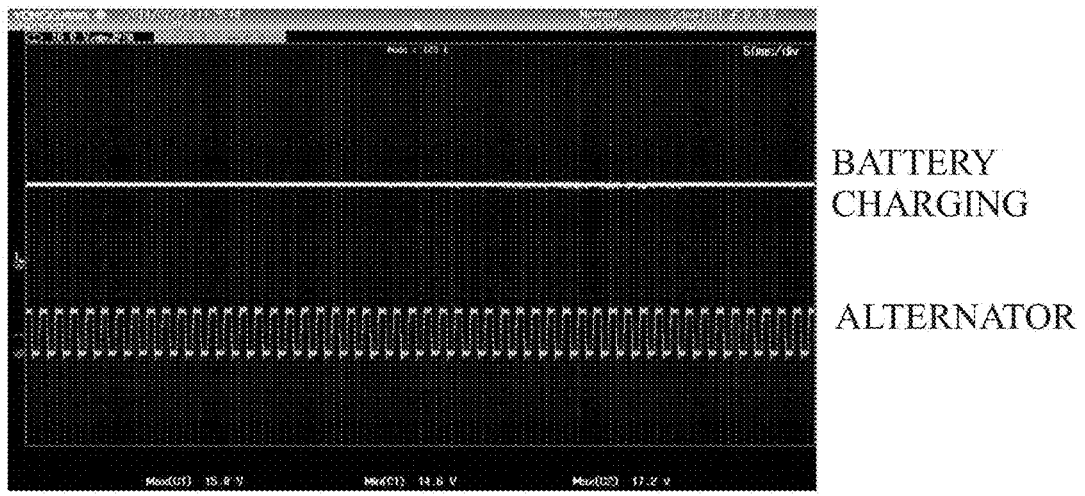
FIG. 11 is the test result of a three phase battery charging rectifier regulator system manufactured in accordance with this invention having a SCR (Silicon-controlled) rectifier connected in series mode, under test conditions at speed of 1,000 rpm depicting wave forms of (a) alternator output, (b) battery charging voltage.
Figure 12:
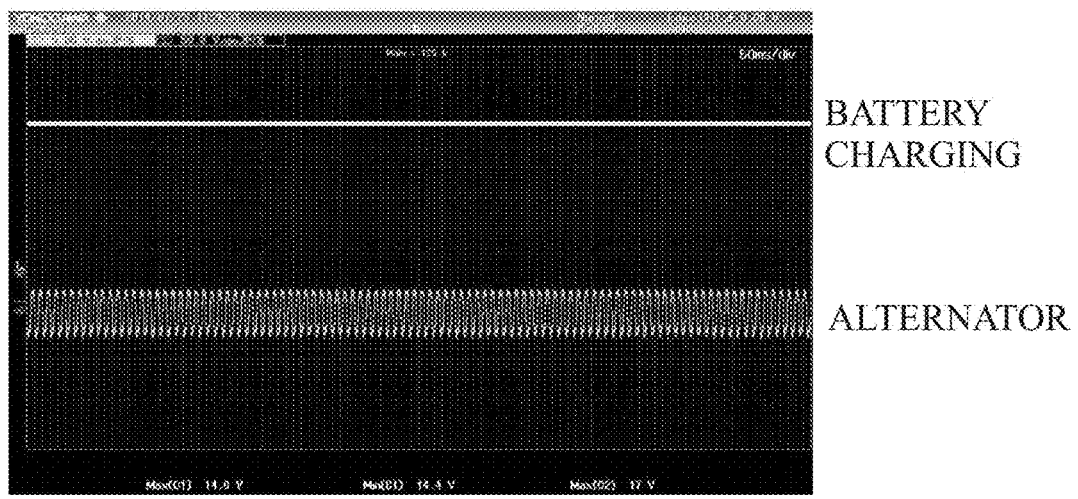
FIG. 12 is the test result of a three phase battery charging rectifier regulator system manufactured in accordance with this invention having a SCR (Silicon-controlled) rectifier connected in series mode, under test conditions at speed of 2,000 rpm depicting wave forms of (a) alternator output, (b) battery charging voltage.
Figure 13:
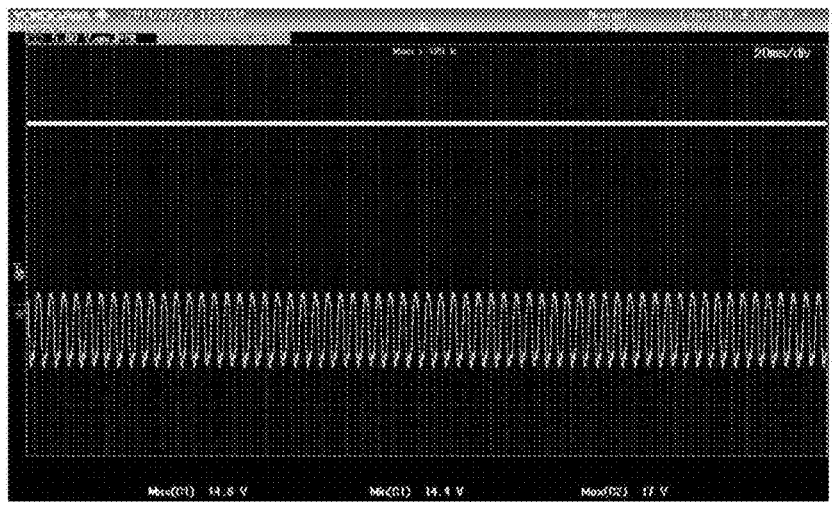
FIG. 13 is the test result of a three phase battery charging rectifier regulator system manufactured in accordance with this invention having a SCR (Silicon-controlled) rectifier connected in series mode, under test conditions at speed of 3,000 rpm depicting wave forms of (a) alternator output, (b) battery charging voltage.
Figure 14:
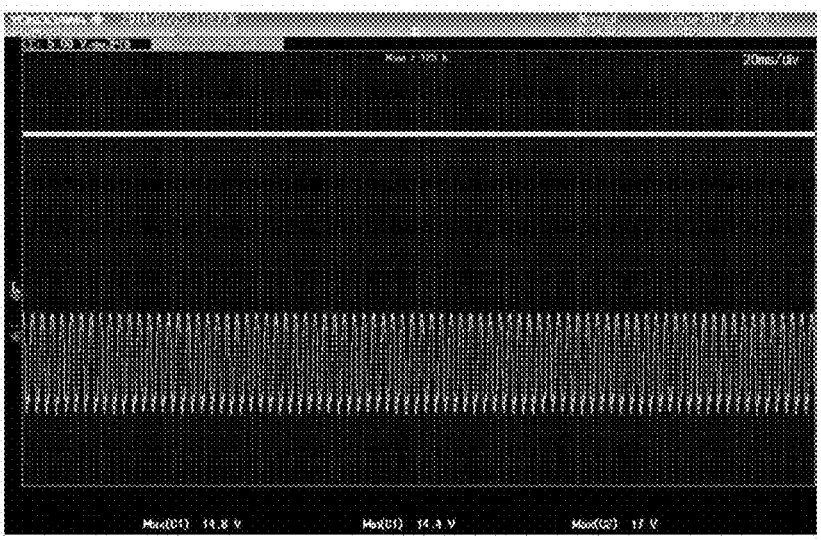
FIG. 14 is the test result of a three phase battery charging rectifier regulator system manufactured in accordance with this invention having a SCR (Silicon-controlled) rectifier connected in series mode, under test conditions at speed of 4,000 rpm depicting wave forms of (a) alternator output, (b) battery charging voltage.
Figure 15:
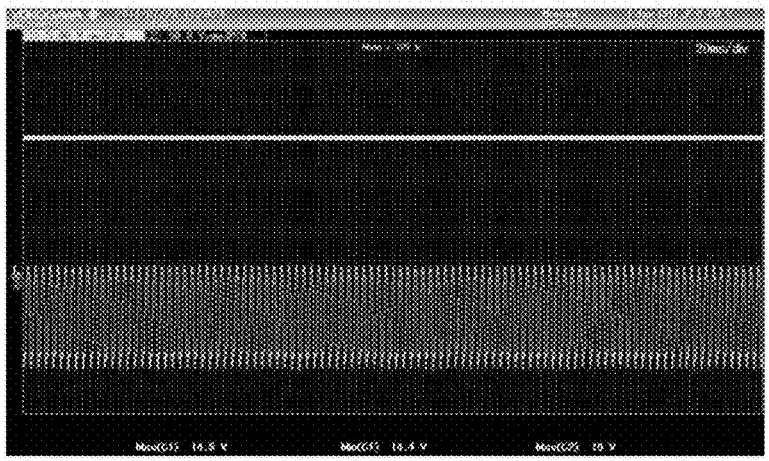
FIG. 15 is the test result of a three phase battery charging rectifier regulator system manufactured in accordance with this invention having a SCR (Silicon-controlled) rectifier connected in series mode, under test conditions at speed of 5,000 rpm depicting wave forms of (a) alternator output, (b) battery charging voltage.
Figure 16:
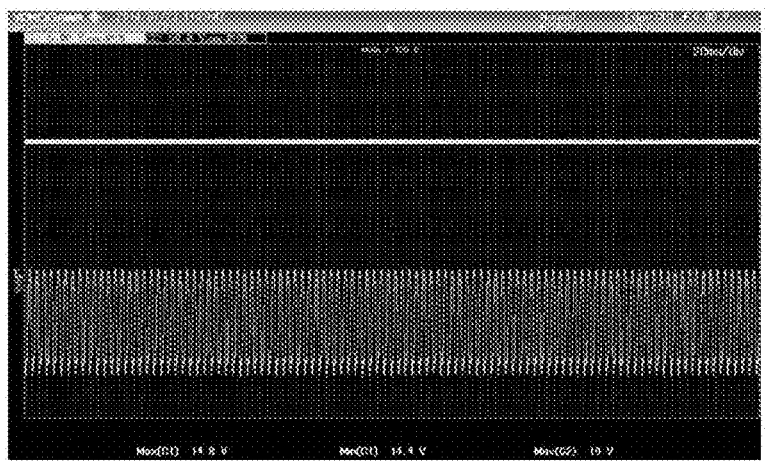
FIG. 16 is the test result of a three phase battery charging rectifier regulator system manufactured in accordance with this invention having a SCR (Silicon-controlled) rectifier connected in series mode, under test conditions at speed of 6,000 rpm depicting wave forms of (a) alternator output, (b) battery charging voltage.
Figure 17:
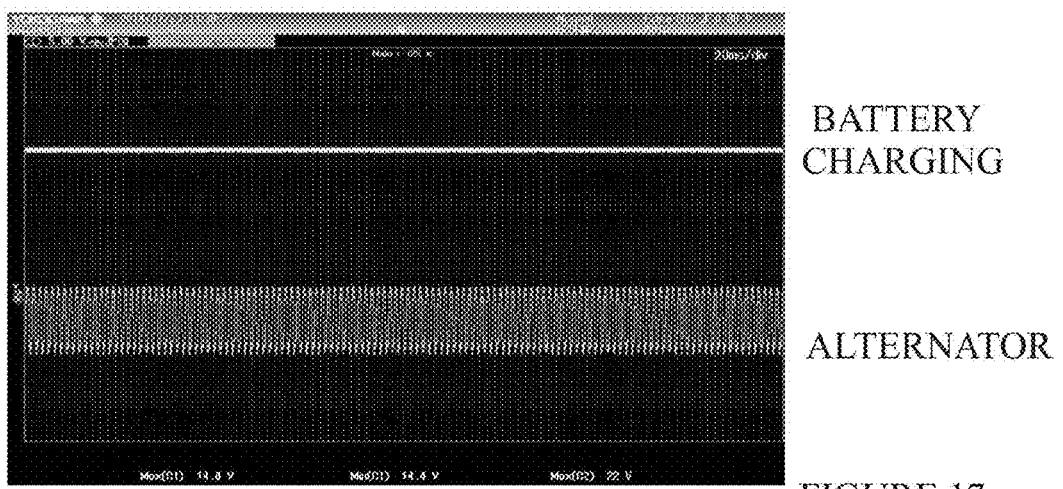
FIG. 17 is the test result of a three phase battery charging rectifier regulator system manufactured in accordance with this invention having a SCR (Silicon-controlled) rectifier connected in series mode, under test conditions at speed of 7,000 rpm depicting wave forms of (a) alternator output, (b) battery charging voltage.
Figure 18:
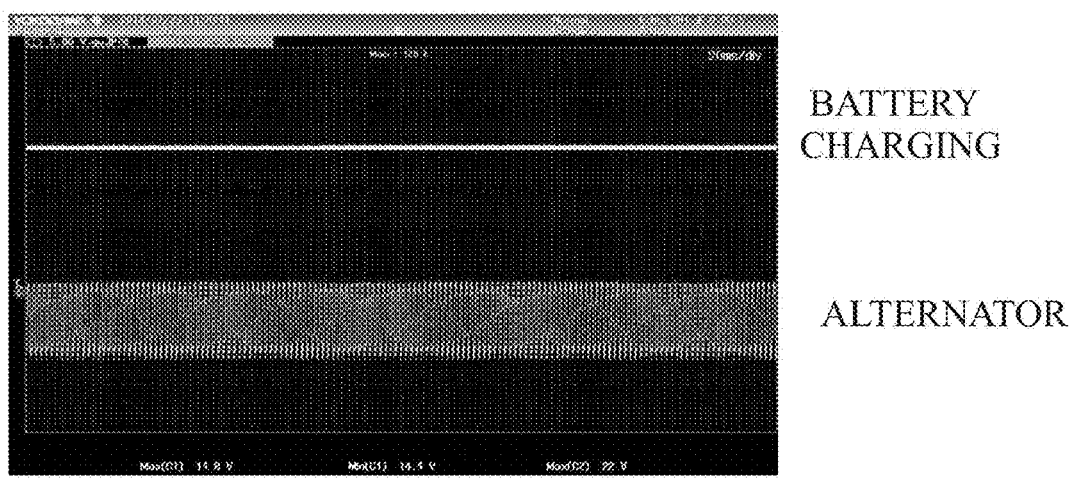
FIG. 18 is the test result of a three phase battery charging rectifier regulator system manufactured in accordance with this invention having a SCR (Silicon-controlled) rectifier connected in series mode, under test conditions at speed of 8,000 rpm depicting wave forms of (a) alternator output, (b) battery charging voltage.
Figure 19:
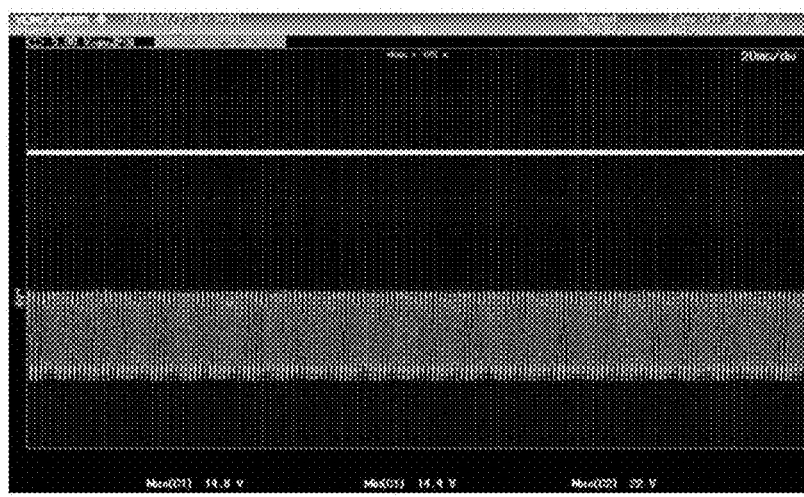
FIG. 19 is the test result of a three phase battery charging rectifier regulator system manufactured in accordance with this invention having a SCR (Silicon-controlled) rectifier connected in series mode, under test conditions at speed of 9,000 rpm depicting wave forms of (a) alternator output, (b) battery charging voltage.
Figure 20:
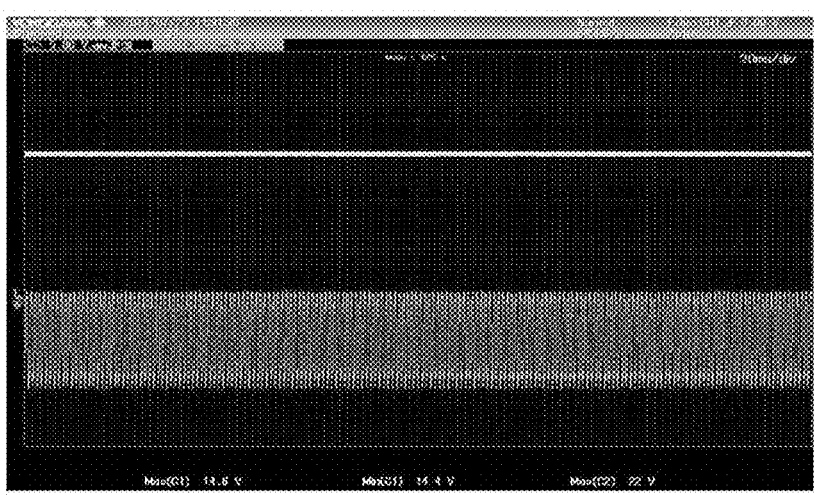
FIG. 20 is the test result of a three phase battery charging rectifier regulator system manufactured in accordance with this invention having a SCR (Silicon-controlled) rectifier connected in series mode, under test conditions at speed of 10,000 rpm depicting wave forms of (a) alternator output, (b) battery charging voltage.

FIG. 10 shows the basic configuration of the, three phase automotive alternator based battery charging SCR (Silicon-controlled) rectifier circuit connected in parallel (shunt) in accordance with this invention;

A system based on the use of a mixed signal programmable chip and a battery of 12 volt output, to be mounted on a two wheeler having pre defined potential loads (engine, lights and such other related loads) was designed. A Harvard-architecture processor having operating voltage: 3.0 V to 5.25 V and capable of withstanding a temperature range −40° C. to +85 was selected. A rectifier regulator in accordance with this invention was designed and built.

The completed assembly of the rectifier regulator in accordance with this invention was mounted on a test rig and rotated at speeds of 1000, 2000, 3000, 4000 and 10000 rpm of the rotor at varying load levels designated as night mode and twilight mode. The wave forms of the alternator output, load side and battery charging voltage were recorded. A FIGS. 12 to 20 depicts the wave forms recorded at the different load conditions.

FIGS. 11 to 20 are the test result of a three phase battery charging rectifier regulator system manufactured in accordance with this invention having a SCR (Silicon-controlled) rectifier connected in series mode, under test conditions at speed of 1,000 to 10,000 rpm in steps of 1000 rpm, depicting wave forms of (a) alternator output, (b) battery charging voltage.

The test results show that the rectifier regulator in accordance with this invention has the following advantages:
1. Flicker less circuit
2. Re-programmability for adding new feature
3. Less number of the components compare to prior art regulator rectifier (75~80% Less)
4. Soldering Points Reduced by 60%
5. Reduction in PCB Size
6. Reduced casting Size
7. Reduced process rejections.

While considerable emphasis has been placed herein on the particular features of a "three phase regulator rectifier for automotive battery charging and control application suitable for of a two wheeled vehicle" and the improvisation with regards to it, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. A three phase regulator rectifier, for two wheeler battery charging application, adapted to rectify an alternating current output of a rotary power generating member first to energize connected electrical components of the two wheeler and second to apply a defined potential difference between terminals of a lead acid battery to maintain a charged state of said battery, said device comprising:
   (i) a plurality of stationary coils annularly positioned around magnetic flux of a rotary member; said coils interconnected in sets of three so as to induce electromagnetic force alternating from positive to negative in each of the three sets in a phased manner;
   (ii) Semiconductor circuits adapted to modify said induced electromagnetic force from an alternating form to a steady state in each of said three set of coils;
   (iii) an integrated programmable semiconductor chip provided with circuits adapted to sense continuously variable physical quantity and magnitudes in discrete units of a physical quantity; said semiconductor chip adapted to vary said alternating and steady state electromagnetic force to energize connected electrical components of the two wheeler and to apply a defined potential difference between terminals of a lead acid battery respectively; and
   (iv) a feedback and control circuit integral to said programmable semiconductor chip adapted to sense varying energy load of said electrical components so as to intermittently maintain a preset steady state potential difference between said battery terminals.

2. A three phase regulator rectifier for two wheeler battery charging application as claimed in claim 1, wherein the integrated programmable semiconductor chip provided with configurable circuits including low pass or band pass filters, digital buffers, programmable gain amplifiers, programmable PWM signal generators, programmable Temperature sensors, ramp or signal generators, zero crossing detectors and charge pump circuits.

3. A three regulator rectifier for two wheeler battery charging application as claimed in claim 1, wherein the semiconductor circuits comprises of SCR, MOSFET, IGBT and such other circuits in combination of at least two connected either in series or in parallel between stationary coils of the rotary power generating member and lead acid battery.

4. A three regulator rectifier for two wheeler battery charging application as claimed in claim 1, wherein the semiconductor circuits are connected between the stationary coils of rotary power generating member and the battery of the vehicle system with or without fuse links in between.

5. A regulator rectifier for two wheeler battery charging application as claimed in claim 1, wherein said integrated programmable semiconductor chip in cooperation with said feedback and control circuit and semiconductor circuits are adapted to control three phase rectification bridge connected to the rotary power generating member.

* * * * *